Jan. 23, 1940.                F. M. BROWN                2,187,964
                                VALVE
                          Filed Feb. 9, 1939

Frederick Morgan Brown  Inventor

Patented Jan. 23, 1940

2,187,964

UNITED STATES PATENT OFFICE 2,187,964

VALVE

Frederick Morgan Brown, Los Angeles, Calif.

Application February 9, 1939, Serial No. 255,524

1 Claim. (Cl. 277—55)

This invention relates to improvements in valves, and more particularly to a combined check and cut-off valve.

It is an object of the invention to provide a valve having its valve head mounted for free movement relative to the valve seat when the valve is open, whereby the valve serves as a check valve should the flow of liquid through the valve become suddenly arrested.

A further object of the invention resides in providing a valve of the above-mentioned character having automatic means for admitting air into the valve casing to prevent any siphonage action when the flow of liquid stops.

Another object of the invention resides in providing a device of the above-mentioned character which is simple and durable in construction, reliable and efficient in operation, and inexpensive to manufacture.

Other objects and advantages of the invention will be apparent during the course of the following description.

Figure 1:
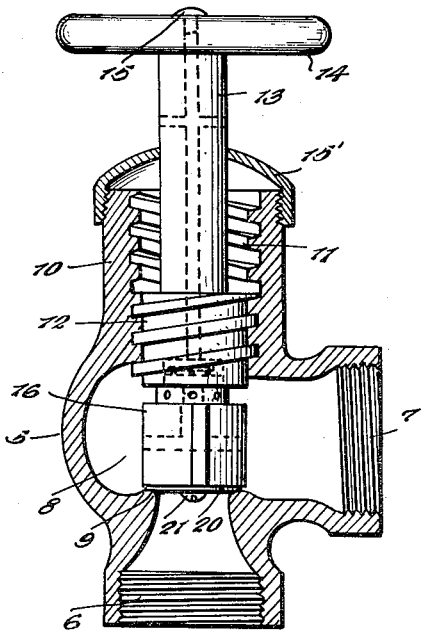
Figure 2:
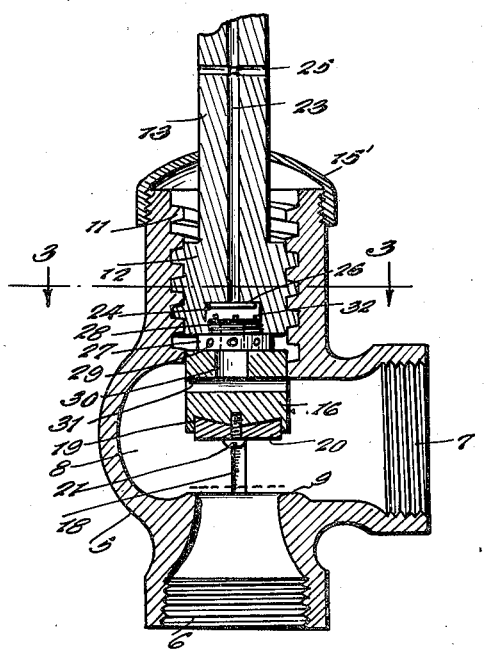
Figure 3:
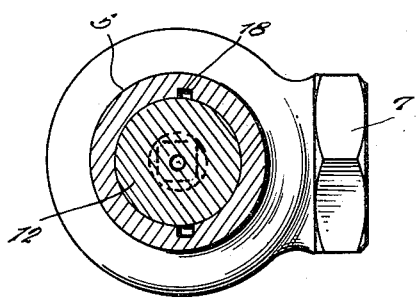
Figure 4:
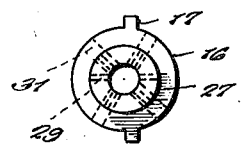
Figure 5:
Figure 6:

In the accompanying drawing forming a part of this specification, and in which like numerals are employed to designate like parts throughout the same, Fig. 1 is a vertical sectional view of the valve in closed position, Fig. 2 is a similar view of the valve in open position, Fig. 3 is a cross section taken on line 3—3 of Fig. 2, Fig. 4 is a top plan view of the valve head, and Figs. 5 and 6 are perspective views of the top and bottom faces of the valve washer.

In the drawing, wherein for the purpose of illustration I have shown a preferred embodiment of my invention, the numeral 5 represents the valve casing having the usual inlet 6, outlet 7, interior chamber 8, and valve seat 9 in alinement with the inlet. A collar 10 extends from the casing in axial alinement with the inlet 6 having interior female threads 11 which engage with the threads of the worm 12 formed integral with the lower end of the stem 13 having a hand wheel 14 attached to its upper end by a screw 15. A cap 15' is attached to the upper end of the collar 10 having a central opening through which the stem extends. A valve head 16 is mounted to reciprocate between the worm 12 and inlet 6 and moves in axial alinement with the valve seat 9. The valve head on opposite sides is provided with longitudinal ribs 17, slightly off center, which engage in vertical slots 18 formed in the walls of the chamber 8 and thereby guide the movement of the valve head and prevent the same from rotating. The bottom of the valve head 16 has a recess 19 to receive the valve washer 20 secured to the valve head by a screw 21. The top face of the washer is concaved, as at 22, to fit over the convexed bottom of the recess. The stem 13 has a central longitudinal passage 23 which communicates with the recess 24 in the lower end of the worm 12, and a transverse passage 25 through the upper end of the stem intersects the passage 23. A square valve disk 26 is loosely fitted in the recess 24 and a nut 27 having a threaded collar 28 is screwed into the recess 24 to retain the valve disk in place. The nut 27 is provided with a series of radial passages 29 communicating with the bore of the nut, and the valve head 16 has a passage 30 in its upper end alined with the bore of the nut, the passage 30 communicating with the transverse openings 31 through the valve head. A plurality of pins 32 project from the end of the collar 28 and prevent the valve disk 26 from seating over the bore of the nut.

In operation, when the valve is in open position the pressure of the liquid entering the valve casing through the inlet 6 will raise the valve head with the valve washer from its seat. If for any reason the flow of liquid from its source should cease, the valve head and valve washer will drop by gravity and automatically close the inlet 6. This prevents any backward flow of liquid through the valve, and at the same time any siphonage action in the valve casing is broken by the admission of air into the casing through the passage 23 which is at all times in communication with the atmosphere. The passage of air into the casing is controlled by a valve disk 26 which permits air to pass into the valve casing as long as any siphonage action exists, but acts under the pressure of liquid in the valve casing to close the passage 23 to prevent any leakage of liquid through the passage 23. When it is desired manually to close the valve, the handle is turned to move the worm downwardly which moves the valve head into engagement with the valve seat. The valve head is held against rotation and the valve washer does not change its seating position, at any time, during its operation. If the air passage through the stem becomes clogged, the handle may be removed and a wire inserted through the passage to remove the obstruction.

It is to be understood that the form of my invention herein shown and described is a preferred example of the same, and that certain changes in the shape, size, and arrangement of the parts may be made without departing from the spirit of the invention or scope of the subjoined claim.

Having thus described my invention, I claim:

A combined check and cut-off valve comprising a casing having an inlet and outlet, a valve seat in alinement with said inlet, a vertically movable valve head carrying a valve washer for engaging said valve seat, said valve head having a transverse opening therethrough communicating with a vertical passage through the top of the valve head, vertical ribs formed on opposite sides of said valve head adapted to engage in vertical slots in the walls of said casing to guide the movement of the valve head, a stem threadedly mounted in said casing for movement towards and from said valve head having a recess in its lower end communicating with a longitudinal passage through the stem, said longitudinal passage having radial passages extending therefrom adjacent the upper end of said stem outside of said casing, a nut threaded in the recess in the lower end of said stem having a longitudinal bore and radial passages extending therefrom, the longitudinal bore of said nut being in alinement with the vertical passage in said valve head, a valve disk disposed in the recess in the lower end of said stem between said nut and the lower end of the longitudinal passage of the stem, and pins projecting upwardly from the inner side of said nut to prevent said valve disk from closing the bore of said nut.

FREDERICK MORGAN BROWN.